United States Patent Office 2,762,748
Patented Sept. 11, 1956

2,762,748
DRYING OF YEAST TO INACTIVATE ZYMASE AND PRESERVE LACTASE

Robert P. Myers, Cincinnati, Ohio, assignor to National Dairy Research Laboratories, Inc., Oakdale, N. Y., a corporation of Delaware No Drawing. Application March 31, 1953,
Serial No. 346,025

3 Claims. (Cl. 195—65)

This invention relates to the production of lactase enzyme and, more particularly, to a process of preparing a lactase-active zymase-inactive yeast product of bland flavor and good stability, and to the product obtainable by this process.

The utilization of milk products in concentrated form has been limited heretofore by the low solubility of lactose in water. For example, skim milk cannot be stored if it is concentrated beyond a total solids content of 30%, for at higher concentrations large lactose crystals quickly are deposited. Similarly, there is an upper limit of solids concentration for both whole milk and whey beyond which lactose crystallization becomes a problem. Also, in the manufacture of ice cream the amount of milk solids-not-fat must be within the range from 10 to 10.5%, for at higher proportions lactose will crystallize on storage and produce a so-called "sandy" ice cream.

Crystallization of lactose is a serious problem, because it upsets the uniformity of the product and makes the product difficult to handle and use. The problem is further complicated by the difficulty experienced in redissolving lactose once it has crystallized.

For this reason, it has been proposed that the lactose present in milk be hydrolyzed to simple sugars more soluble in water than lactose through use of lactase enzyme. In such a process the lactase enzyme preparation is added to the milk, which is then incubated at an elevated temperature until the desired amount of hydrolysis has taken place.

Accordingly, it is an object of the invention to provide an improved method of preparing a lactase enzyme preparation which can be employed to hydrolyze the lactose present in milk and produce a nearly or substantially lactose-free milk product of good flavor.

It is further an object of the invention to prepare a lactase-active zymase-inactive yeast product of bland flavor and good stability.

These objects are accomplished in accordance with the invention by propagating yeast of a lactase-producing strain under growth-favoring conditions in a nutrient medium in which lactose is the chief source of carbohydrate and then treating the yeast to inactivate the zymase. More specifically, the invention is concerned with a particular method of drying the yeast in order to inactivate zymase without inactivating the lactase.

Among the yeast strains which may be propagated by the process of the invention are *Saccharomyces fragilis*, *Torulopsis spherica*, *Zygosaccharomyces lactis*, and strains of *Torula utilis* and *Candida pseudotropicalis* adapted to the utilization of lactose for growth and fermentation.

The ingredients and proportions thereof essential to any nutrient medium employed for the propagation of yeast, and particularly yeasts of the above strains, are well known to those skilled in the art and details thereof need not be given here. It is important, however, that nutrient media employed in accordance with the present invention contain lactose as the chief source of carbohydrate in an amount within the range from 0.5 to 5%. The total solids content of the nutrient medium should be between about 2 and about 8%, preferably 3%, and its pH should be approximately 4.5, but a satisfactory enzyme preparation can be obtained employing a nutrient medium whose pH lies within the range of 3.5 to 7.5.

The nutrient medium may be prepared synthetically by dissolving in water 0.5 to 5% lactose, 0.4% of some source of inorganic nitrogen, such as urea, ammonia, or diammonium phosphate, 1% peptone, 0.5% yeast extract, and other yeast nutrient materials. Usually it is more convenient, however, and less expensive, to employ as a base for the medium a natural product which contains all or a large proportion of the materials required for yeast growth, and to supply nutrients in which the material may be deficient. Well known materials in plentiful supply which contain all yeast nutrient requirements except inorganic nitrogen are whey derived from cheese or casein manufacture, and the mother liquor-wash water obtained as a waste product in the production of lactose from whey or milk products.

In Table I there is given the typical composition of some aqueous dilutions of whey and whey derivatives useful as a base for the yeast nutrient medium:

TABLE I

| | Cheddar Cheese Whey, percent | Cream Cheese Whey, percent | Casein Whey, percent | Mother Liquor Wash Water, percent |
|---|---|---|---|---|
| Total Solids | 3.0 | 3.0 | 3.0 | 3.0 |
| Lactate Ion | 0.11 | 0.26 | | |
| Acidity as lactic | 0.10 | 0.24 | 0.01 | 0.11 |
| Fat | 0.13 | 0.062 | | |
| Total Nitrogen | 0.055 | 0.04 | 0.022 | 0.04 |
| Lactose. H₂O | 2.23 | 2.11 | 2.74 | 1.5 |
| Amino Nitrogen | 0.013 | 0.02 | 0.01 | 0.019 |
| Ammonia | 0.013 | 0.026 | 0.002 | |
| Urea | 0.0095 | 0.0056 | | |
| Calcium | 0.0215 | 0.0377 | | |
| Sodium | 0.0215 | 0.0175 | | |
| Potassium | 0.071 | 0.058 | | |
| Magnesium | 0.004 | 0.004 | | 0.25 |
| Phosphate | 0.100 | 0.100 | | |
| Ash | 0.24 | 0.243 | 0.38 | 0.86 |

It has been determined that it is most important that the nutrient medium be pasteurized before yeast is added thereto. Pasteurization may be brought about by heating the medium at 140 to 160° F. for 30 minutes or longer, or 165° F. for ½ hour, or at 170 to 190° F. or higher for 10 to 60 seconds.

Consequently, when whey is employed as the yeast nutrient medium in the process of the invention, while the whey is kept at an elevated pasteurization temperature, it is fortified with such additional yeast nutrient materials as may be required. It is desirable to add these materials at a pasteurization temperature in order to destroy bacteria contained therein. Some source of inorganic nitrogen should be added, say 0.2% urea, 0.14% ammonia, or 0.4% diammonium phosphate. Also, if desired, 0.1% cornsteep may be added. The solids content of the whey is then adjusted to within the range from 2 to 8%. Dependent upon the initial solids content, this may be accomplished either in the course of fortifying with additional solid nutrient material or by dilution with water or a solution of the added nutrient material.

Before addition of yeast, the nutrient medium is brought to a propagation temperature within the range of 80 to 100° F. An actively growing starter culture of the yeast in the nutritive medium then is added in an amount of 10% on the basis of the main batch of medium. This inoculation should give a main fermentation batch containing an initial cell count of 10 to 60 million yeast cells per ml. During fermentation the nutrient medium is held at a temperature within this range; a temperature of 86° F. is the optimum.

If no aeration is employed, 30 hours or more may be required for the fermentation. Therefore, in order to shorten the fermentation time it is desirable to aerate the nutrient medium. Aeration at a rate of 0.009 volume of air per volume of nutrient medium per minute will reduce the fermentation time to from 18 to 24 hours, while a higher aeration rate, of the order of 0.5 volume of air per volume of nutrient medium per minute, will further reduce the fermentation time to from 10 to 12 hours. In general, the higher the rate of aeration, within the range of aeration rates specified, the higher the yield of yeast. While an aeration rate within the range of 0.009 to 0.5 volume of air per volume of nutrient medium per minute is preferred, it will be understood that higher aeration rates may be employed to meet special requirements.

If, in addition to aeration, the nutrient medium is agitated vigorously, it is possible to further reduce the fermentation time to from 2 to 8 hours.

With a combination of aeration and agitation, it is possible to establish a continuous fermentation process in which the yield of yeast in a unit time is at least 10 times that of a batch process under similar growth-favoring conditions. In this process, nutrient medium is fed in at a constant rate to replenish exhausted nutrients, while fermented nutrient medium is withdrawn at a similar constant rate for the harvesting of yeast therefrom. Such a continuous process is particularly desirable from a commercial point of view.

The nutrient medium is the same as is used in a batch process, when fortified with the higher amounts of nitrogen, and preferably is derived from whey. In practice, the nutrient medium is inoculated with wet yeast cake in an amount equal to one to two billion yeast cells per cc. (0.7 to 1.4%, by weight of the medium based on the dry weight of the yeast added), and these cells are encouraged to grow at a maximum rate under optimum growth-favoring conditions of aeration (0.1 to 1 volume of air per volume of nutrient medium per minute), agitation (sufficient to give a dispersion of small air bubbles throughout the liquid), and temperature (80° to 100° F.) using proper rates of feeding in of nutrient medium and withdrawing of fermented liquors.

A yeast concentration of one to two billion cells per cc. represents approximately the maximum concentration which can be maintained without overcrowding. Therefore it is desirable in a continuous process to maintain the concentration within this range by removing fermentation liquor continuously at the same rate at which fresh nutrient medium is added.

Yeast may be harvested from this withdrawn liquor continuously or from time to time, as desired. Spent liquors may be fortified with nutrients, and reused.

At 86° F., with proper agitation and aeration at a rate of 0.2 volume of air per volume of medium per minute, using a whey-base nutrient medium of 3% total solids, fortified with 0.4% diammonium phosphate, an initial inoculation of one billion actively growing S. fragilis yeast cells per cc. of medium, a continuous fermentation will double itself to form 2 billion yeast cells per cc. every 4 hours, whereas a batch fermentation under the same conditions would produce only 0.15% of yeast cells or a maximum of 200 million yeast cells per ml. in the same time and not over 800 million yeast cells per ml. in 18 hours.

In either the batch or continuous processes, if a product of superior taste properties is desired, it is advisable to wash the yeast in water after it has been harvested. For most uses, however, as in the hydrolysis of lactose for the preparation of an animal feed or as a nutrient in antibiotic media, washing is not essential.

The harvested yeast contains a high proportion of lactase and zymase. The lactase enzyme preparation is intended to be used in the hydrolysis of lactose to glucose and galactose without converting glucose and galactose to carbon dioxide and alcohol, and it is essential that the lactase be uncontaminated with those yeast enzyme systems which convert glucose and galactose to carbon dioxide and alcohol. These enzyme systems are collectively called "zymase" by the art, and it will be understood that yeast lactase preparations of the invention must be zymase-inactive if conversion of glucose and galactose to carbon dioxide and alcohol is to be prevented. If the zymase content in the yeast is inactive, it is not necessary to separate the lactase from the yeast before adding the preparation to the milk product.

The zymase may be destroyed without destroying the lactase by drying the yeast under carefully controlled conditions.

In accordance with this invention, it has been found that the above result may be achieved by freezing the yeast at a temperature of from about −100° F. or below up to 30° F., preferably from −45° F. to 0° F. and then drying the frozen yeast in vacuo while maintaining the yeast in a frozen condition. This method is capable of producing a light colored easily dissolved product of constant high potency and good flavor. The product can be used to hydrolyze the lactose in a milk product, and produces a hydrolyzed material which is substantially free from any objectionable odor.

The temperature at which the freezing is effected is not critical except to the extent that lower temperatures decrease freezing time. In this connection it is significant that the shorter the freezing time, the higher will be the lactase activity of the product. For this reason it is preferred to freeze the yeast as quickly as possible and for the purpose of this invention the preferred freezing time is less than about 40 minutes.

Once the yeast is frozen the temperature during drying is not critical and any temperature at which the yeast remains frozen can be used. In the interest of quick drying it is preferred to dry at as high a temperature as possible which is about 20 to 30° F. although temperatures as low as −100° F. in the cake can be used. The degree of vacuum employed is relevant only in that it affects the time required for drying, the greater the vacuum the less the time. Usually the vacuum is such that the absolute pressure is less than 1000 microns of mercury. Since variations in drying time do not significantly affect the product, any degree of vacuum may be employed. The temperature of the jacket surrounding the drier may be kept at 80 to 100° F. to speed drying, provided the cake does not rise in temperature above 25° F. and provided the product is removed when completely dry without allowing it to reach the surrounding temperature.

The lactase preparation in accordance with the invention is white, grey or tan in color, depending upon the drying process employed, and preferably will be in powder form or in the form of small friable lumps. The preparation disperses readily in three times its volume of water. It has the following analysis:

|   | Percent |
|---|---|
| Moisture | 4 to 10 |
| Protein (N×6.38) | 40 to 55 |
| Ash | 7 to 10 |
| Fiber | 3 to 10 |

The lactase activity (and zymase inactivity) of the lactase preparations of the invention is determined by the following test, hereinafter called the lactase activity test: The preparation, when mixed with 30% total solids, pasteurized, nonfat milk concentrate in a proportion of 1 part of preparation to each 40 parts of lactose, shall give 85% conversion of the lactose therein to simple sugars in 4 hours' time at 123° F. A technical grade of the lactase preparation such as might be used in the preparation of animal or poultry feeds would be considered acceptable within the requirements of the lactase activity test if it gives 60% conversion of the lactose to simple sugars within such time at the temperatures stated.

Lactase preparations in accordance with the invention can be prepared as set forth in the following examples:

Example 1

Whey derived from the production of cheddar or cream cheese is treated to remove heat-coagulable protein by adjusting its pH to 4.5 and heating it at a temperature of from 185° to 220° F. until coagulation is complete. The coagulated protein is then separated from the whey by filtration. 0.1% ammonia is added.

The deproteinated whey is cooled to 86° F. and an actively growing *S. fragilis* yeast starter culture of 10% by weight of the whey is added. The mixture is fermented at 86° F. with aeration at the rate of $\frac{1}{10}$ volume of air per volume of liquid for approximately 24 hours, after which the yeast cells are separated from the nutrient medium by centrifuging and washed with warm water.

In order to inactivate the zymase, the yeast cells are quickly frozen by cooling to 0° F. and then dried in vacuo. The dried product passes the lactase activity test and displays no zymase activity. It is easily dispersed or dissolved in a milk product, to hydrolyze the lactose thereof, and because of its bland flavor, light color and good stability it does not impart an unsatisfactory flavor or color to the hydrolyzed milk product.

Example 2

Yeast cake prepared as in Example 1 were dried in vacuo at 200 microns of mercury and at a jacket temperature of 80° F. after freezing under varied conditions. The cake itself did not rise above 25° F. during the drying cycle. The following table gives the conditions used to freeze the yeast cells prior to freeze drying, along with the lactase activity of the dried product (also expressed in percent hydrolysis of skim milk).

| Method of Freezing | Time, min. | Temp., °C. | Percent Hydrolysis | Lactase Activity Test |
|---|---|---|---|---|
| Refrigerator | 40 | −4 | 63 | Passes. |
| Do | 10 | −30 | 65 | Do. |
| Dry Ice | 8 | −80 | 68 | Do. |
| Dry Ice Acetone | 1.5 | −45 | 75 | Do. |
| Dry Ice Acetone (this sample was thawed and refrozen) | 1.5 | −45 | 63 | Do. |

The data shows that lactase activity decreases as freezing time increases. It further shows that freezing temperature is important only in that lower temperatures decrease freezing time. Dry Ice by itself takes unusually long to freeze in spite of the very low temperature because of the difficulty of ultimate contact with the solid material.

The lactase-active zymase-inactive enzyme preparation of the invention may be utilized to hydrolyze the lactose contained in a milk product in order to produce a substantially lactose-free product whose total carbohydrate content is undiminished compared to the natural product, and which has suffered no deterioration in flavor or appearance by the treatment. Thus the preparation may be used for the preparation of ice cream concentrates derived from skim milk solids which do not contain lactose and which therefore do not develop "sandiness." It may also be used to prepare animal feeds which contain a large amount of milk solids but are free from the cathartic effect of lactose.

Various modifications and changes may be made in the conditions under which the process of the invention is carried out, as will be apparent to those skilled in the art, and it will be understood that the invention is not to be limited, except as set forth in the following claims.

All parts and percentages in the specification and claims are by weight, unless otherwise indicated. Percentages of components of the nutrient medium or of the whey are by weight of the nutrient medium, or of the whey, respectively.

This application is a continuation-in-part of copending application, Serial No. 224,252, filed May 2, 1951.

I claim:

1. A method of producing a lactase-active zymase-inactive yeast preparation which comprises freezing a lactase-active zymase-active yeast of a lactase-producing strain at a temperature below about 30° F. and drying the frozen yeast in vacuo, to inactive zymase and obtain a lactase-active zymase-inactive product.

2. A method according to claim 1 in which the yeast is frozen at a temperature between −100 and 0° F.

3. A method according to claim 1 in which the vacuum is less than 1000 microns of mercury absolute pressure.

References Cited in the file of this patent

UNITED STATES PATENTS 2,400,748    Flosdorf _____ May 21, 1946

FOREIGN PATENTS 474,822    Great Britain _____ of 1936

OTHER REFERENCES

Dienert: Comptes Rendus, 129, 1899, pages 63–64.
Oppenheimer et al.: Ferments and Their Actions, Chas. Griffin & Co., Ltd., 1901, pages 204–205.